INVENTOR.
Ellison S. Purington
BY
C D Tuska
ATTORNEY.

PULSED RADIO SIGNALING

Original Filed May 18, 1944 4 Sheets-Sheet 2

INVENTOR.
Ellison S. Purington
BY
C. D. Tuska
ATTORNEY.

PULSED RADIO SIGNALING

Original Filed May 18, 1944 4 Sheets-Sheet 3

INVENTOR.
Ellison S. Purington
BY C. D. Tuska
ATTORNEY

INVENTOR.
Ellison S. Purington
BY
C. D. Tuska
ATTORNEY

Patented Oct. 14, 1952

2,614,210

UNITED STATES PATENT OFFICE 2,614,210

PULSED RADIO SIGNALING

Ellison S. Purington, Gloucester, Mass., assignor, by mesne assignments, to Radio Corporation of America, New York, N. Y., a corporation of Delaware Original application May 18, 1944, Serial No. 536,104, now Patent No. 2,465,925, dated March 29, 1949. Divided and this application June 29, 1945, Serial No. 602,234

6 Claims. (Cl. 250—10)

This application is a division of my copending U. S. application Serial No. 536,104, filed May 18, 1944, entitled "Radio Control System," which matured into Patent No. 2,465,925, granted March 29, 1949, assigned to the same assignee as the instant application.

This invention relates to a radio control system suitable for use in ultra-high frequency channels and has for an object to provide a system of the above type adapted for radio dynamic control or for communication purposes, which is highly selective and which has characteristics such that it is free to a high degree from interference.

Another object is to provide a system of the above type having novel and improved details of construction and features of operation.

Various other objects and advantages will be apparent as the nature of the invention is more fully disclosed.

The present system utilizes two channels in the ultra-high frequency range, such as in the range of 400 to 1000 megacycles, and provides for the transmission of short, timed pulses on the two channels which may be varied as to sequence in accordance with the desired control or signal. The system utilizes a pulse transmitter which is capable of transmitting short pulses of comparatively high power.

A radiant energy pulse is sent from the transmitter to the receiver on one channel followed by a radiant energy pulse on the other channel. There is a frequency separation between the two channels on which energies necessary for operation are sent, and there is a time separation between the arrival of the two energies at the receiver. The freedom from interference depends largely upon the amount of frequency separation of the channels and upon the amount of time separation of the energies on the channels. A most important factor is the use of transmitter energies in the form of short dots or pulses with very high peak radiant power, and with relatively long intervals between the pulses.

By the combination of pulse type transmission, two radiant energy channels and different times of transmission of the energies on the two channels, an extremely high degree of security is provided.

In the present system the pulses may be from 10 to 50 microseconds in length. The time interval between the pulses is several times the length of the pulses themselves, for example, about 5 to 20 times the length of the pulses and successive pairs of pulses are separated by a space having a duration several times the interval between the pulses themselves, for example, 20 to 100 times said time interval.

The control may be responsive to the receipt of a single pair of pulses. Hence the complete transmission may be of extremely short duration, which renders its interception and interference extremely difficult. However, the transmissions may extend over a plurality of pairs of pulses if desired, in which case, accidental interference with one or more of the pairs of pulses would not affect the control.

While it is known to be physically possible and practicable to produce high peak power on a narrow radio band over a short duration of time, it is not practicable to produce a comparable high peak power over both a wide radio band and over a long duration of time, as would be necessary for successful interference purposes. Ordinary, non-pulse transmitters would not be capable of interfering successfully with the control because sufficient power would not be available to produce a response at the receiver matching in intensity the pulse from the pulse transmitter. On the other hand, with a pulse transmitter it would be very unlikely that the interfering pulse would coincide in time with a control pulse, or that its rate of recurrence would correspond to that of the control pulse as would be required to produce interference on succeeding pulses. For high speed telegraphic purposes, for example, a single dot or dash might occasionally be obliterated by interference, but for slow speed or radio control purposes, this amount of interference would be entirely negligible.

In accordance with the present invention, a pulse forming circuit is designed to form a succession of pairs of spaced pulses. The pulses of each pair are separated and are used individually to modulate radio transmitting means operating on two different channels, the first pulse of each pair being connected to modulate the transmitter on one channel and the second pulse of each pair being connected to modulate the transmitter on the other channel. Selective means is provided in the modulating circuit so that the first pulse of each pair may be applied to either channel at will and the second pulse may be applied to the other channel. In this way, the pulses are radiated over the two channels with a frequency sequence determined by the selective means and with a time interval determined by the original pulse forming circuit.

In a specific embodiment of the invention the pulses in the two channels are received by separate receivers tuned to the respective channels and containing the usual detector circuits to make the pulses available in an output circuit. The outputs of the two receivers are connected to a timing comparator which is designed to be responsive only when the pulses are received with a predetermined time spacing.

In one embodiment the timing comparator includes a pulse stretching circuit which is arranged to stretch the pulse from one of the receivers so as to cause the same to overlap in time the pulse from the second receiver when the first pulse is received a predetermined time interval before the second pulse. The combined effect of the two pulses, when they are thus caused to overlap, is utilized to actuate an output relay circuit. When only a single pulse is received or when the pulses are not received in proper time sequence to cause the same to overlap in the output circuit of the comparator no response is produced.

The effect of two overlapping pulses separately applied to the timing comparator is to produce a single pulse of a duration equal to the amount of time of overlap. This can be applied to a relay system operative on a single pulse, as for example a gaseous type electronic relay, which however requires a reset device such as the use of A. C. plate supply if the control operation is to be repeated. While this is satisfactory for some purposes, it is in general preferable to actuate the control from the combined effect of a considerable number of recurrent pulses giving additional security by electrical tuning to the recurrence rate.

Instead of utilizing two separate receivers the incoming radiant energy may be received in a single receiver tuned to respond to both channels. The receiver will then include suitable pulse separation means to separate the pulses received in the respective channels and to apply them to the timing comparator above outlined.

The invention will be described in greater detail by reference to the accompanying drawings in which:

Figure 3 is a schematic diagram of a timing comparator circuit for use in the receiver of Fig. 1.

Figure 1:
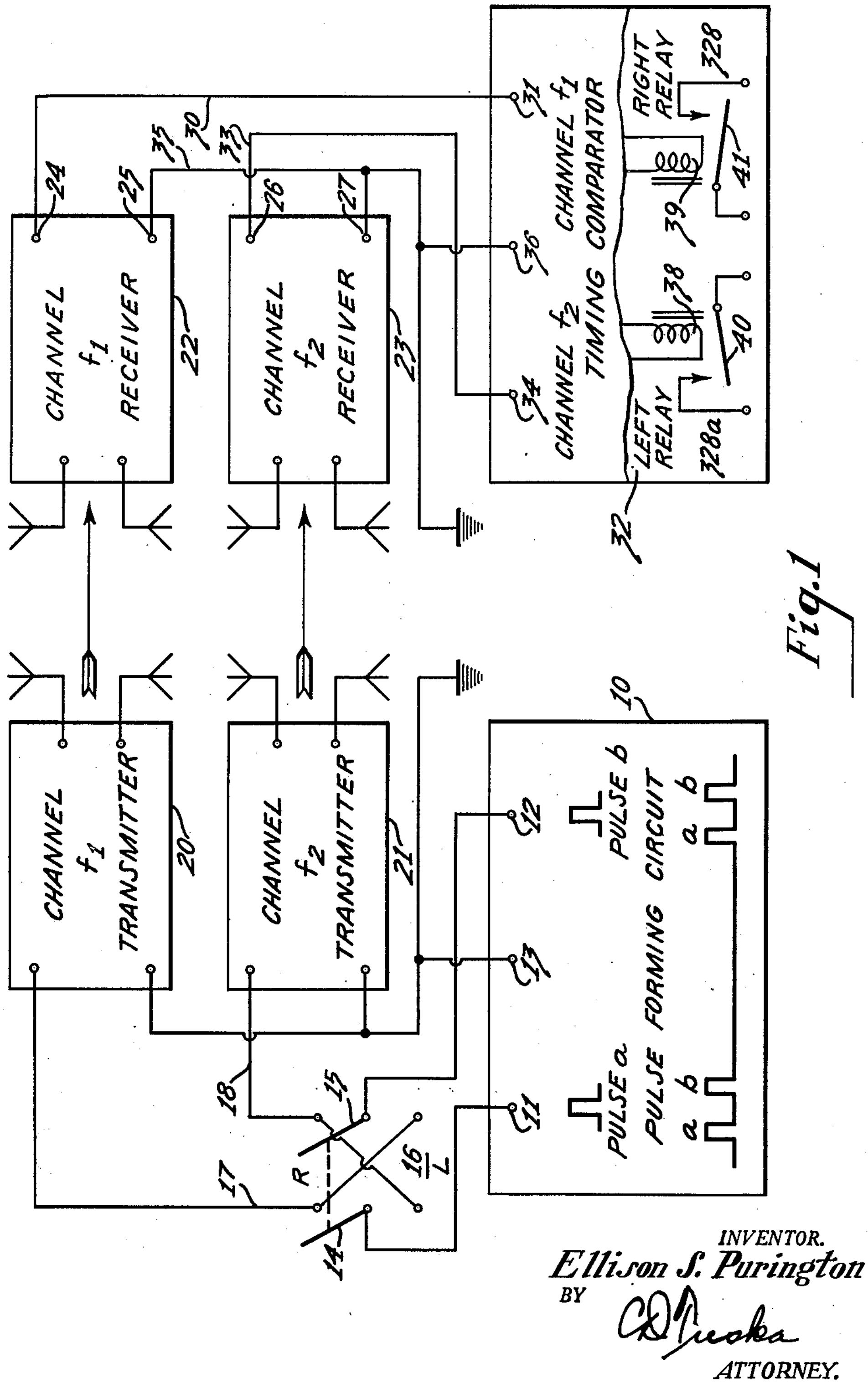
Figure 1 is a block diagram indicating the general arrangement of a transmitter and receiver embodying the present invention.

In the drawings, the radio transmitter and receiver circuits and the tube circuits are shown only in such detail as is necessary to an understanding of the present invention and it is to be understood that the circuits are otherwise of standard and well known form and include the various potential sources and control elements which are well known in the art.

*Figure 1*

Figure 2A:
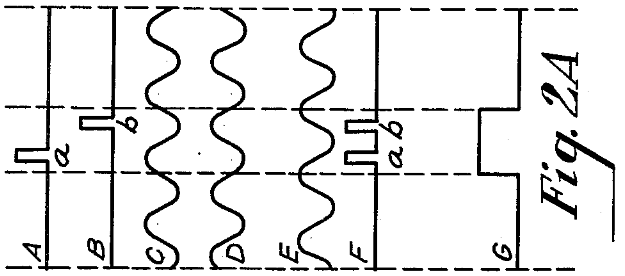
Figure 2A is a series of curves illustrating the operation of the pulse forming circuit.
Figure 2:
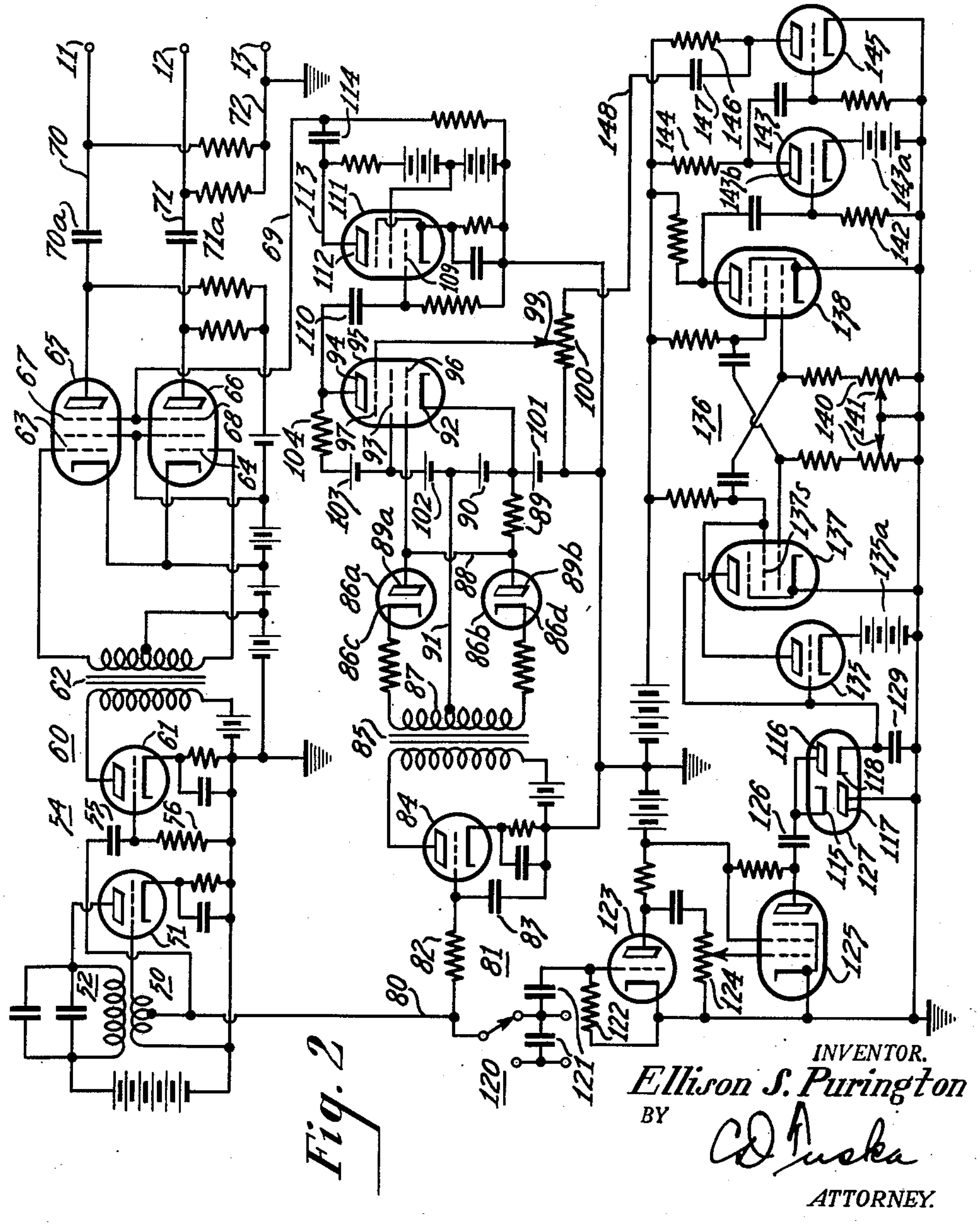
Figure 2 is a schematic diagram of a pulse forming circuit for use in the system of Fig. 1.
Figure 7:
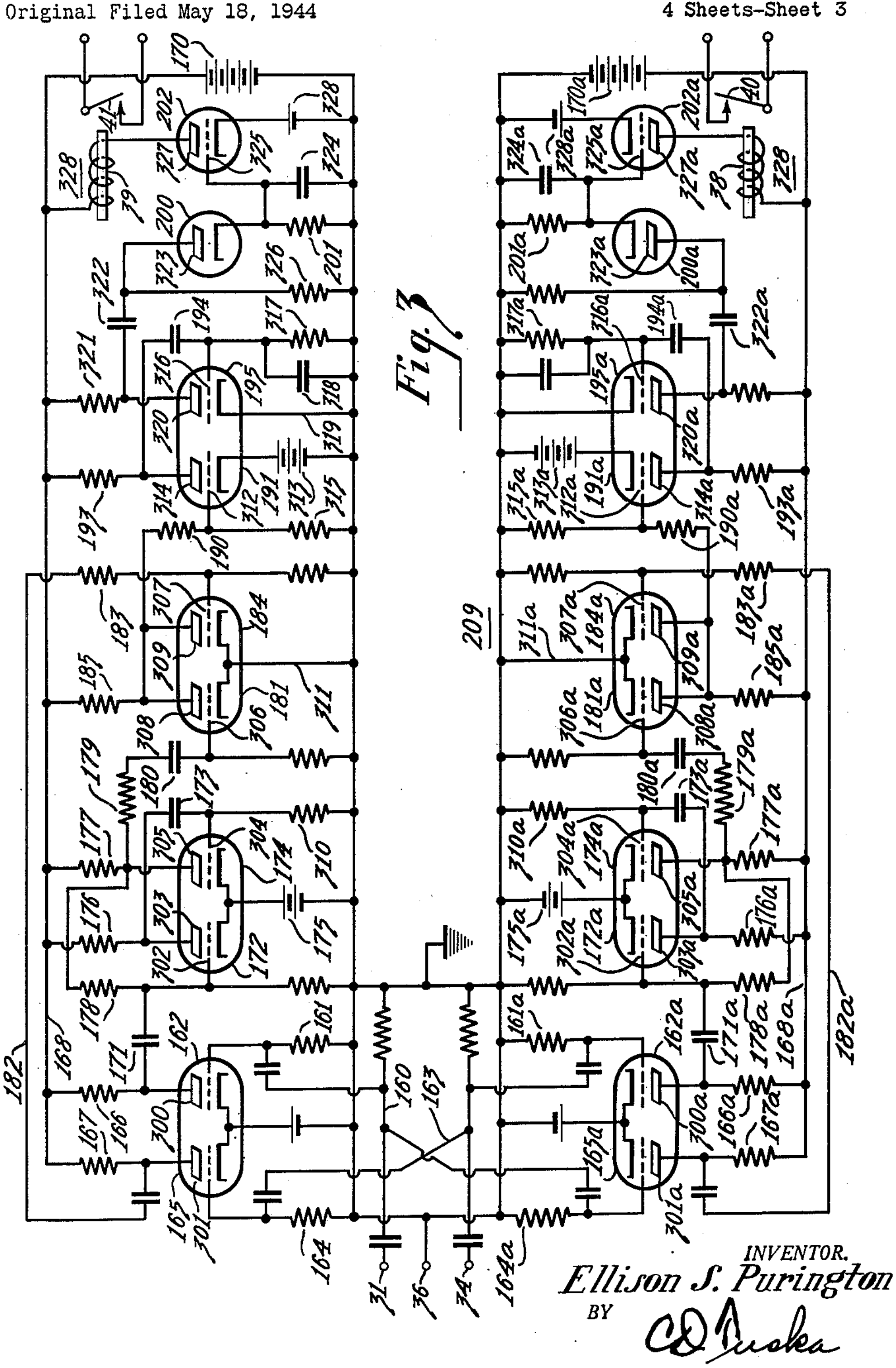

Referring to Fig. 1, the block 10 represents a pulse forming circuit the details of which are shown in Fig. 2 and which is adapted to produce a series of spaced pairs of pulses *a* and *b* and to separate the pulses of each pair as indicated in separate circuits terminating at terminals 11 and 12 respectively and having a common ground terminal 13. The pulse *a* of each pair of pulses on terminal 11 is assumed to precede the pulse *b* on terminal 12 although this sequence may be reversed if desired.

The terminals 11 and 12 are connected to poles 14 and 15 respectively of a double pole double throw, reversing switch 16 the stationary contacts of which are connected by lines 17 and 18 respectively, to the input circuits of radio transmitters 20 and 21 respectively. The radio transmitters 20 and 21 are preferably of the shortwave pulse type and are adapted to radiate carriers on frequencies $f_1$ and $f_2$ amplitude modulated respectively by the pulses *a* and *b*. The transmitters may be designed to radiate only when a pulse is received from the pulse forming circuit 10, so that the energy radiated constitutes a series of spaced pulses occurring first on the frequency $f_1$ and then on the frequency $f_2$ for switch position R, or vice versa for switch position L.

The pulses radiated by the transmitters 20 and 21 are received by the receivers 22 and 23 respectively which are preferably of the superheterodyne type terminated with detectors to produce pulses in their output circuits indicated by the terminals 24, 25, 26 and 27. The terminal 24 of the receiver 22 is connected by a line 30 to an input terminal 31 of a timing comparator 32, the details of which are shown in Fig. 3. The terminal 26 of the receiver 23 is connected by a line 33 to an input terminal 34 of the timing comparator 32. The terminals 25 and 27 are indicated as connected by a line 35 to ground and to a common input terminal 36 of the timing comparator 32.

The timing comparator 32 includes circuits to be described which are selected so that when the pulse on channel $f_1$ precedes the pulse on channel $f_2$, a right relay 39 is energized and when the pulse on the channel $f_2$ precedes the pulse on the channel $f_1$ a left relay 38 is energized. These relays are provided with armatures 41 and 40 respectively which are adapted to close work circuits which may constitute selective control for mobile objects such as right and left steering controls or a speed control or a suitable signalling circuit, such as an automatic dot-dash receiver.

The arrangement therefore is such that the relays 39 and 38 will be selectively actuated in accordance with the direction of closure of the switch 16 which controls the sequence of the pulses on the two channels. The switch may, of coures, take the form of a push-button, key, or other suitable device which is readily operated for control or signalling purposes.

The timing comparator circuit 32 is preferably designed so that no operation results unless and until both pulses are received and unless the pulses are of sufficient duration and length and are spaced within the specified time limits. In addition, the system may be designed to respond only when the pulses on the two channels are repeated with a recurrence rate within specified limits. In this way the system is made highly selective and free from interference.

*Figure 2*

Referring to Fig. 2, the pulse forming circuit is shown as comprising a master oscillator 50 of a type having high stability and designed to oscillate, for example, at 660 cycles per second. The oscillator 50 includes a tube 51 and a frequency control circuit 52 together with the usual bias and regulating circuits, all of which are of standard construction.

The output circuit of the oscillator 50 includes a phase shitfer 54 comprising a condenser 55 and a resistor 56 connected in series. The resistor 56 is connected in the input circuit of a vacuum tube amplifier 60 including an amplifier tube 61 and an output transformer 62. The condenser 55 and resistor 56 are preferably of equal numerical impedance at the frequency of operation so that the voltage across the resistance 56 leads the input voltage to the phase shifter by 45°. Hence, the voltage to the amplifier 60 leads the voltage from the oscillator circuit by 45°.

The secondary of the transformer 62 is of the push-pull type, the two ends of which are connected to the input grids 63, 64 of a pair of modulator tubes 65 and 66, respectively. Pulses, formed in the manner to be described, are applied to the suppressor grids 67 and 68 of the tubes 65 and 66 by a line 69. The plate circuit of the tube 65 is connected by a condenser 70$a$ and a line 70 to the output terminal 11, and the plate circuit of the tube 66 is connected by a condenser 71$a$ and a line 71 to the output terminal 12. The two terminals are connected through resistors to a common grounded return line 72 which is connected to the terminal 13. The tubes 65 and 66 are normally biased by their suppressor grids to an inoperative condition and are designed to be capable of passing current only when a voltage pulse is received from the line 69.

The oscillator 50 is also coupled by line 80 through a phase shifter 81 consisting of a resistance 82 and a condenser 83 to the input circuit of an amplifier tube 84. The phase shifter 81 is similar to the phase shifter 54, but in this case the input circuit of the tube 84 is connected across the condenser of the phase shifter. Hence the voltage supplied to the tube 84 lags 45° behind the voltage from the oscillating circuit. Inasmuch as the voltage applied to the tube 60 leads by 45°, a 90° phase difference is produced between the voltages applied to the tubes 60 and 84.

The tube 84 feeds, through an output transformer 85, a pair of rectifiers 86$a$ and 86$b$ having cathodes 86$c$ and 86$d$ respectively connected to the two ends of the secondary 87 of the transformer 85 and having anodes connected together by a line 88 and thence through a resistor 89 and a biasing battery 90 and a return lead 91 to the center tap of the secondary 87. The biasing battery 90 is connected to determine the voltage values at which current will flow through the rectifiers due to the voltage impressed by the secondary 87. Rectified current flows through a tube internally from plate to cathode, thereafter externally through secondary winding 87 and line 91 to the positive side of battery 90, through the battery to the negative side and thence through resistor 89 to the plates 89$a$ and 89$b$ of the rectifying tubes. No current flows in resistor 89 except when the cathode of one of the rectifiers is negative with respect to line 91 by an amount exceeding the voltage value of battery 90.

The positive side of resistor 89 is connected to the cathode 92 of a key tube 95, and the negative side of resistor 89 is connected to the grid 96 of the key tube 95. At both the positive and the negative peaks of voltage across secondary 87, the current through resistor 89 is maximum, so that the grid 96 of tube 95 is then highly negative with respect to the cathode 92. As the voltage cycle progresses, the grid 96 of tube 95 comes to cathode potential, the rectifying tube cuts off due to battery 90, and the grid 96 of tube 95 remains at cathode potential until the other rectifying tube becomes conductive thereby returning the grid to a negative value. In this manner, the grid of tube 95 is actuated by voltage pulses with a peak value which brings the grid of tube 95 to cathode potential and causes it to remain at that potential a short interval of time to form trapezoidal current pulses occurring at a rate of twice the frequency of oscillator 50.

The key tube 95 is shown as a pentode, with the cathode 92 positively biased with respect to ground by a battery 101, and with the screen 93 and plate 94 positively biased with respect to the cathode by batteries 102, 103. The positive side of battery 103 is connected to the plate of tube 95 through a plate coupling resistor 104. The suppressor grid 97 of tube 95 is connected by line 98 to a variable tap 99 on resistor 100, one side of which is connected to the negative and grounded side of battery 101, and the other side of which is connected to a line 148.

In the absence of voltage across resistors 89 and 100, the grid of tube 95 is at cathode potential, but nevertheless no plate current flows because the cathode is highly positive with respect to the suppressor. Therefore the control grid pulses due to rectification of voltage from secondary 87 are not repeated to form corresponding plate current pulses except when the tube 95 is unblocked by a current through resistor 100 which brings the suppressor to the vicinity of cathode potential. A circuit to be described later provides for pulsing resistor 100 recurrently in such a manner that in the embodiment shown the suppressor is brought to the cathode potential for a sufficient time to pass two pulses from the control grid to plate, then suppress the passage of 20 pulses. This is repeated recurrently in such a way that for example two consecutive pulses out of every twenty-two impressed on the grid 96 actually produce plate current, leaving an interval between centers of pairs of pulses 22 times the interval between centers of the pulses themselves.

Due to the use of a high voltage swing from transformer secondary 87, the key tube 95 also operates as a clipper tube so that only the peaks of the pulses are repeated into the plate circuit, thereby forming rectangular or slightly trapezoidal shaped output pulses.

The plate 94 of tube 95 is connected through condenser 110 to the input grid 109 of a resistance coupled amplifier stage including pentode 111, the output of which is coupled through condenser 114 to line 69. Positive pulses of plate current to tube 95 cause negative pulses of voltage to the grid 109 of tube 111, negative pulses of current to the plate 112 of tube 111, and positive pulses of voltage to the line 69 and therefore to the suppressor grids 67 and 68 of tubes 65 and 66. The control grids 63, 64 of the tubes 65 and 66, however, are connected in push-pull to the secondary of the transformer 62. Hence one of these control grids is positive with respect to the center tap of the transformer while the other control grid is negative. When a positive pulse is applied to the suppressor grids 67, 68 from the line 69 a pulse is produced in the output circuit of the tube whose control grid is positive at that instant. The pulses supplied to the suppressor grids are timed by the phase shifters 54 and 81 to occur on alternate half cycles of the voltage supplied to the control grid. Hence, one pulse from the line 69 is received when the control grid of the tube 65 is positive and the next pulse is received when the control grid of the tube 66 is positive. The first pulse is thus passed through the lead 70 to the circuit including the output terminal 11 and the next pulse is passed through the lead 71 to the circuit including the output terminal 12, this sequence being repeated whenever a pair of pulses is applied from line 69. These pulses can be considered as positive pulses of current towards the plates of tubes 65 and 66, and as negative voltage pulses from the output terminals to ground.

*Pulse control circuit*

The lead 80 from the oscillator 50 is also connected to an adjustable phase shifter 120 comprising a pair of condensers 121 and a resistor 122 connected in series. The resistor 122 is connected to the input circuit of an amplifier tube 123, the output circuit of which is connected by means of a tapped resistor 124 to the input circuit of an amplifier 125.

The output circuit of the amplifier 125 is connected through a condenser 126 to one cathode 115 and one anode 116 of a double diode rectifier tube 127, the other anode 117 of which is connected to a return lead 128 and the other cathode 118 of which is connected to lead 128 by a condenser 129. The double rectifier tube 127 and the condensers 126 and 129 constitute a portion of a counter circuit which in the embodiment described is designed to operate on a ratio of 11 to 1.

Such a counter circuit is well known in the art being described in RCA Review, July 1940, "A precision television synchronizing signal generator" by Bedford and Smith and is accordingly not described herein in further detail. 660 cycle voltage appearing in the output circuit of the amplifier 125 charges the condenser 126 on one half cycle. When the right hand side 116, 118 of the double rectifier 127 is conductive the condenser 126 discharges into the condenser 129 and increases the potential of its upper plate. On the next half cycle the right hand side of the double rectifier 127 becomes non-conductive so that the charge remains on the condenser 129, whereas the left hand side 115, 117 of the double rectifier becomes conductive and allows the charge to leak off of the condenser 126 and bring its right hand plate to ground potential. Hence repeated energies controlled by tube 125 are applied to the condenser 129 until a predetermined voltage is built up therein.

The condenser 129 is connected in the input circuit of a trigger tube 135, the output circuit of which is connected to control the operation of a multi-vibrator 136.

The multi-vibrator 136 is of standard construction and in the form shown includes a pair of tubes 137 and 138 having screen and control grids which are cross connected, the respective grids being connected to a resistance network including a pair of resistors 140 having variable taps 141. The arrangement is such that the normal frequency of operation of the multi-vibrator 136 in the absence of synchronization will be one-eleventh of 660 cycles, that is 60 cycles. This free running value will be controlled to a limited degree by the setting of the taps 141 on the resistors 140.

The trigger tube 135 is connected to be pulsed when a predetermined voltage is applied to the input circuit thereof by the condenser 129. The output circuit of the trigger tube is connected to the oscillating circuit of the multi-vibrator 136 in such a way that the multi-vibrator falls in step with the pulses of the trigger tube over a substantial variation in setting of the taps 141.

In the embodiment disclosed the cathode battery 135a of tube 135 and the condenser 129 are so chosen so that the condenser will be charged to a sufficient voltage to cause the trigger tube 135 to operate and pass current when eleven charges are received from the condenser 126. By this triggering operation, a synchronizing control voltage is impressed upon the screen 137s of tube 137, due to the current through tube 135. This control voltage also causes the plate to cathode branch of tube 137 to be highly conductive and discharges the condenser to or nearly to ground potential. Thereupon eleven more cycles of charge on condenser 129 again cause the trigger operation. Hence the multi-vibrator 136 is caused to operate accurately on a frequency one eleventh of that of oscillator 50, that is at 60 cycles per second. Slight adjustments of phase of the multi-vibrator oscillations can be made by adjusting the capacitance of the phase shifting condenser 121, and by adjustment of the double resistor 140.

The multi-vibrator is designed to produce a 60 cycle alternating pulse in the plate circuit of tube 138 with spaced peaks as distinguished from a sine wave. These pulses are applied across a resistance 142 in the input circuit of a clipper tube 143 which is biased by a battery 143a to operate only at the peaks of the input pulses. The plate circuit of the clipper tube 143 includes a plate resistance 144 which lowers the plate voltage when plate current flows therein.

The plate 143b of the clipper tube 143 is connected to the input circuit of an amplifier tube 145 which is normally biased to pass current and is provided with a plate resistance 146. The plate current of this tube 145, however, is reduced when the grid potential is reduced due to a reduction in plate voltage of the tube 143. This reduction in plate current through the plate resistance 146 causes an increase in the plate voltage in the form of a positive voltage pulse which is supplied by a condenser 147 and lead 148 to the resistor 100 above mentioned.

The operation of the multi-vibrator 136 and the bias of the clipper tube 143 are such that the output voltage pulses in the tube 145 are of a duration coresponding to a pair of pulses on the control grid 96 of the tube 95 and are so timed by phase adjustment that the positive bias thus supplied to the suppressor grid 97 of the tube 95 serves to produce a single pair of pulses in the output circuit of the tube 95. These pulses are supplied to the suppressor grids 67, 68 of the tubes 65 and 66 as above described. With the multi-vibrator 136 operating at 60 cycles, a single pair of pulses is released each 60th of a second. Since the pulses themselves are derived from a 660 cycle wave and are separated by one half a cycle, the spacing of the centers of successive pairs of pulses is twenty-two times the spacing of the individual pulses of each pair.

*Operation of Figure 2*

The operation of the pulse forming circuit will be better understood by referring to the series of curves A to G shown in Fig. 2A. As previously pointed out, a 60 cycle pulse of exactly one eleventh the frequency of oscillator 50 is produced by the multi-vibrator 136. The peaks of this pulse are clipped by the clipped tube 143 and are applied to the amplifier tube 145 to produce a series of spaced rectangular pulses, one of which is represented by the curve G in Fig. 2A. These pulses are supplied to the suppressor grid 97 of the tube 95 and serve to unblock the tube 95 during the pulse intervals.

A pulse is applied to the control grid 96 of the tube 95 each time the voltage in the secondary 87 of the transformer 85 passes through zero. The secondary voltage is indicated by the curve E of Fig 2A and the pulses applied to the control grid 96 and repeated as plate current are represented at *a* and *b* on the curve F. These pulses *a* and *b* are continuously repeated on the control grid 96 but only appear in the output circuit of the tube 95 when they coincide with a pulse on the suppressor grid. Hence, only pairs of pulses are produced in the output circuit of the tube 95 as indicated by the curve F.

The voltages supplied to the control grids 63, 64 of the respective tubes 65 and 66 from the master oscillator 50 are represented by the curves C and D of Fig. 2A. It is to be noted that these voltages are both of 660 cycles frequency but are 180° out of phase due to the push-pull connection of the two control grids. When the pulses *a* and *b* from the output circuit of the tube 111 are received on the suppressor grids 67, 68 of the tubes 65 and 66, one or the other of the tubes 65 or 66 is rendered conductive, depending upon which of the tubes is receiving a positive bias on its control grid at that instant.

As illustrated in Fig. 2A, the curve E is displaced 90° with respect to the curves C and D due to the phase shifters 54 and 81. Hence the pulses of the curve F which occur as the curve E crosses the zero axis, coincide with the peaks of the waves C and D. In the embodiment illustrated, the first pulse *a* of the curve F occurs during the positive half cycle of the curve C which is assumed to be the curve of the grid voltage of the tube 65. Hence, the first pulse of each pair will appear in the output plate circuit of the tube 65 as indicated by the curve A of Fig. 2A and the second pulse of each pair will appear in the output plate circuit of the tube 66. These pulses cause corresponding negative voltage pulses to occur at output terminals 11 and 12. The phase shifter 120 and resistors 140 are adjusted to obtain the proper phase relationship between the curve G and the curve F for causing pairs of pulses to be produced.

Referring now to Fig. 1, the pulses in the output circuit of the pulse forming circuit are shown as connected through control switch 16 to modulate transmitters 20 and 21 which, as previously pointed out, are operating on different channels. The pulse *a* at the terminal 11 always occurs before the pulse *b* at the terminals 12. The control switch 16 determines to which of the transmitters 20 or 21 the first pulse is to be applied. Hence the output waves of the transmitters represent a pulse on the channel $f_1$ followed by a pulse on the channel $f_2$ or vice versa, depending upon the position of the switch 16.

*Receiving apparatus*

The waves radiated from the transmitters 20 and 21 of Fig. 1 are shown as received by the receivers 22 and 23 which are tuned to the respective wave frequencies and are of standard construction to make the received pulses available in the output circuits of a detector. The detectors are of a type which will supply positive pulses at terminals 24 and 26 with respect to ground terminals 25 and 27. These pulses are supplied to the circuits including input terminals 31 and 34 of the timing comparator 32. The pulse at the terminal 31 either precedes or lags behind the pulse at the terminal 34 depending upon the sequence of the transmitted pulses. The circuit for the timing comparator 32 is shown more in detail in Fig. 3.

*Figure 3*

Referring now to Fig. 3, the terminal 31 is connected by a line 160 to a resistor 161 in the input circuit of an amplifying triode 162. The terminal 34 is connected by a line 163 to a resistor 164 in the input circuit of an amplifying triode 165. The return leads from the resistors 161 and 164 are connected to the terminal 36. The plates 300, 301 of the triodes 162 and 165 are fed through resistors 166 and 167 respectively from a line 168 connected to a source of plate potential shown as a battery 170. For simplicity of construction, the triodes 162 and 165 may be housed in a common envelope, as may other triodes of the Fig. 3. They will be described however for convenience as independent tubes.

The pulse output of the tube 162 is fed through a condenser 171 to the control grid 302 of a tube 172. The plate 303 of tube 172 is connected through a condenser 173 to the control grid 304 of a tube 174. The cathodes of the tubes 172 and 174 are connected to ground through a biasing battery 175. The plates 303, 305 of the tubes 172 and 174 are connected to the line 168 through resistors 176 and 177 respectively. The plate 305 of the tube 174 is also connected through a resistor 178 with the control grid 302 of the tube 172 and through a resistor 179 and a condenser 180 to the control grid 306 of a key tube 181. The output circuit of the amplifier tube 165 is connected by a line 182 through a resistor 183 to the control grid 307 of an amplifier tube 184. The plates 308, 309 of the tubes 181 and 184 are connected in parallel through a resistance 185 to the line 168.

The tubes 172 and 174 and associated circuits constitute in effect a pulse stretching system which operates when energized by a short negative pulse on the input grid terminal of tube 172 to produce a negative pulse of longer duration and in the same sense on the output circuit of companion tube 174. The output of one tube shown as tube 172 is capacity coupled to the input of the other tube 174 as in a multi-vibrator, but the output of the tube 174 is directly coupled to the input of the tube 172 as in an electrical toggle. This system has one stable equilibrium position in the absence of signals. When the condition of stable equilibrium is momentarily upset, as by a pulse on grid 302 of tube 172 from the plate 300 of tube 162, the system does not instantaneously return to the equilibrium condition, because of the energy change in condenser 173 during the pulsing. As a result the plate current of output tube 174 continues to change after the pulse on tube 172 has passed.

In the embodiment shown in the equilibrium condition tube 174 is biased to below cutoff by battery 175, while tube 172 passes curent due to the positive voltage on its grid 302 derived from battery 170 through resistors 177 and 178. A positive pulse applied from terminal 31 to ground upon amplifier 162 causes a negative pulse to be applied from the output of tube 162 upon the grid 302 of tube 172. In the equilibrium condition with no current flowing to or from the condenser 173 its lower plate is at ground potential and its upper plate is at the potential of the line 168 diminished by the very heavy drop through resistor 176 to the plate 303 of the current carrying tube 172. When now the negative pulse is impressed upon the control grid 302 of tube 172, the plate current is momentarily diminished toward or to zero, thereby decreasing the voltage drop in resistor 176 and increasing the potential on the upper plate of condenser 173. This tends to make the upper plate of condenser 173 more positive by a charging current to the condenser from the plate 303 of tube 172, and this charging current, represented in the condenser as a displacement current, causes corresponding current to flow from the lower plate of condenser 173 to ground through the grid resistor 310. As a result, both the upper plate and lower plate of the condenser 173 are raised to a higher potential, and the grid 304 of tube 174 which is connected to the lower plate of condenser 173 is quickly raised to the potential of the cathode of tube 174 or higher. This in turn increases the current flow to the plate 305 of tube 174, thereby lowering its plate potential due to the increased drop through resistor 177. Due to the direct coupling from plate of tube 174 to ground through resistor 178, the lowering of plate voltage of tube 172 drives its grid negatively in the same sense as the original pulse. If condenser 173 were of infinite capacity, the grid 302 of tube 172 would continue to be held negative, so that the controlling pulse from tube 162 would be followed by a permanent holding pulse from tube 174. However due to the capacity of condenser 173 being finite, the potential across condenser 173 changes in accordance with the voltage and resistance in its external circuit. With the grid of tube 172 driven negatively beyond cutoff, making tube 172 currentless, condenser 173 is charged to increase its voltage toward the limiting value of battery 170. But as it approaches this value, the charging current diminishes, decreasing the current through the grid-to-cathode and grid-to-ground path for tube 174, so that tube 174 commences to draw less current. As a result the potential of tube 172, until now held below cutoff after the control pulse from tube 162 has passed, approaches the cutoff point. When during the charging of condenser 173 by a current through resistor 176, the cutoff point of tube 172 is reached, and it commences to pass plate current also through the resistor 176, the charging of condenser 173 is checked due to the lowering of voltage applied to the top plate of condenser 173, the grid voltage of tube 172 drops toward zero and due to the coupling from tube 174 to tube 172 the action of causing tube 172 to pass plate current is accelerated. With the charging of condenser 173 checked, the operation of the tubes is such as to cause the condenser to discharge to its equilibrium condition. During this discharge operation, the voltage on the grid 304 of tube 174 is highly negative beyond cutoff, so that equilibrium is reached with no further change in plate current of tube 174.

By this action, the negative pulse impressed for a short time by the tube 162 upon the grid of tube 172 causes an extended positive pulse to appear on the grid of tube 174, and an extended negative pulse to be impressed from the plate of tube 174 onto the grid 306 of tube 181.

The alternating current output of the amplifying tube 165 is transmitted through line 182 and resistor 183 to the control grid 307 of triode tube 184. Consequently through the action of tubes 162, 172 and 174, a positive pulse applied to terminal 31 causes a negative pulse with the same starting time, but of longer duration to be impressed upon the input of tube 181. Also by the action of tube 165, a positive pulse applied to terminal 34 causes a corresponding unstretched negative pulse to be impressed upon the input of tube 184. By suitable choice of the resistors and the condenser 173 associated with pulse stretching tubes 172 and 174, the pulse on tube 181 may be caused to last longer than the time interval between pulses on terminals 31 and 34. Therefore in the event that terminal 31 is pulsed first and terminal 34 later, within a predetermined time limit established by the action of tubes 172 and 174, overlapping pulses will be impressed on the two tubes 181 and 184. If however terminal 34 is pulsed first then the pulse on tube 184 will have passed before the pulse on tube 181 starts, and there will be no overlap of these pulses.

The tubes 181 and 184 are coincidental key tubes, and in the embodiment shown they are triodes, with the cathodes connected together and grounded by a line 311 and with the plates 308, 309 connected together and fed from the line 168 through the resistor 185. The plates 308, 309 are direct coupled through resistor 190 to the grid 312 of a clipper tube 191 having its cathode biased positive with respect to ground by a battery 313 and its plate 314 fed from the line 168 through a resistor 193. The grid 312 of tube 191 is positively biased by the direct current flowing through resistors 185 and 190 and through the grid resistor 315 to ground, but the cathode battery 313 biases the cathode of tube 191 to a much higher potential than its grid, so that as a net result, tube 191 is biased considerably beyond cutoff so that normally no plate current flows through resistor 193.

Circuit conditions are so adjusted that no current passes through resistor 193 until the grids of both tubes 181 and 184 are very considerably negative. In the absence of a pulse on tube 181 for example, cutoff of tube 184 by a negative pulse will cause a change of plate current through resistor 185, but no effect in resistor 193. Only when the pulses on tubes 181 and 184 are coincidental will there be a pulse through resistor 193.

It is possible to utilize the pulse through resistor 193 to trigger off a gaseous relay tube, but in the present embodiment, use is made of the fact that the pulses established in resistor 193 are of a recurrent nature.

The plate 314 of clipper tube 191 is connected through condenser 194 to the grid 316 of amplifying triode 195, which in turn is connected to ground by a resistor 317 and condenser 318 in parallel. The cathode of the triode amplifier 195 is grounded by line 319 and its plate 320 is connected to line 168 through a plate resistor 321. The plate 320 of tube 195 is coupled through a condenser 322 to the anode 323 of a rectifier 200, the cathode of which is connected to ground through resistor 201, bypassed by a condenser 324, and also is connected to the grid 325 of a relay tube 202. A resistor 326 connected from the anode 323 of rectifier 200 to ground provides a D. C. return path for rectifier 200. The plate 327 of relay tube 202 is connected to the winding 39 of a relay 328, the other side of which is connected to line 168, and the cathode of relay tube 202 is positively biased by a battery 329 so that no plate current will flow unless there is current passing through resistor 201 due to action of the rectifier 200. The relay 328 is provided with an armature 41 for closing an external work circuit.

The constants of the circuit associated with amplifier 195 are so chosen that it selectively integrates and amplifies the pulse power derived from the plate of clipper tube 191. This produces a wave form with high proportion of energy content in the fundamental rate of pulsing which is impressed on rectifier 200. This wave form is rectified, and smoothed out by the cathode condenser 324 of tube 200, and the D. C. component of the rectified current raises the grid of relay tube 202 to cathode potential causing plate current to flow and attract the relay armature 41.

In the operation of Fig. 3 thus far discussed, when upon closure for example of switch 16 to position R a positive pulse is impressed upon terminal 31 with respect to ground terminal 36, followed by a positive pulse upon terminal 34 within a predetermined time limit, amplifier 162 of Fig. 3 impresses a negative pulse upon pulse stretching circuit involving tubes 172, 174 and resulting in a negative pulse of longer duration impressed upon the grid 306 of coincidental key tube 181. The duration of this pulse overlaps the time interval at which a negative pulse is impressed upon coincidental key tube 184 due to the later pulse received from tube 165. By the coincidental action of tubes 181 and 184, clipper tube 191 is pulsed positively so that a pulse flows in the plate resistor 193 during the interval of overlap. This pulse is broadened, integrated and amplified by tube 195 and rectified by tube 200 to cause operation of the relay armature 41.

In the alternative event that switch 16 of Fig. 1 is thrown for example to position L the pulse on terminal 34 precedes that on terminal 31 the circuit above described will operate to produce pulses in resistor 185 which are insufficient to cause operation of the clipper tube 195. For utilizing the possible control corresponding to terminal 34 being pulsed before terminal 31, a companion circuit 209 is provided. This may be of the same general construction as that previously described, with corresponding parts designated by like numbers but followed by the letter *a*. However terminal 34 is connected to drive the grid of tube 162*a* and terminal 31 is connected to drive the grid of tube 165*a*. Therefore the pulse delay circuit 209 responds to a pulse on terminal 34. The output of circuit 209 includes a relay 328*a* with armature 40.

In this manner, the circuit of the timing comparator of Fig. 3 provides for operation of left relay 328*a* when the switch 16 is closed to position L which pulses channel $f_2$ before $f_1$ and it provides for closure of right relay 328 when the switch 17 is closed to position R which pulses channel $f_1$ before $f_2$.

Figure 4:
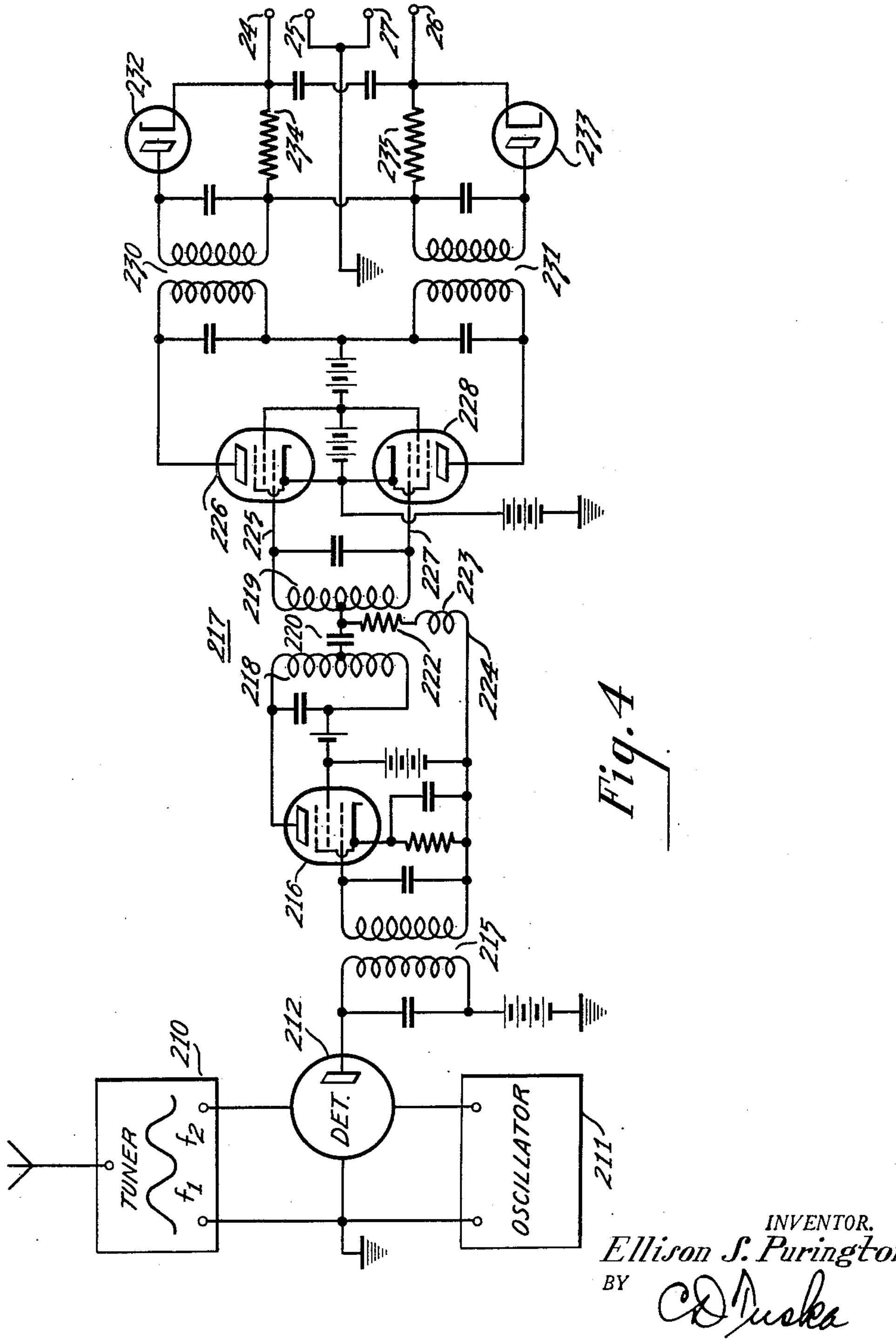
Figure 4 is a schematic diagram of a pulse receiver utilizing a single radio receiver tuned to both channels and a pulse separating circuit actuated thereby.

*Figure 4*

In the system shown in Fig. 1 two independent receivers 22 and 23 are provided which are tuned respectively to the channels $f_1$ and $f_2$. Fig. 4 shows a circuit for receiving both channels on a single intermediate frequency type receiver and separating the pulses for application to the timing comparator. Referring to Fig. 4, the block 210 indicates a receiving circuit which is tuned broadly to receive the two channels $f_1$ and $f_2$. A single frequency local oscillator 211 and a detector 212 are connected to make the two pulses available as intermediate frequency pulses in an output circuit transformer 215 tuned to both intermediate frequencies in a well known manner. These pulses are supplied through the transformer 215 to an amplifier tube 216, the output circuit of which is connected to a well known type of frequency discriminating circuit 217 which includes coupled inductors 218 and 219 forming parts of a coupled circuit system and connected at their mid-points through a condenser 220. The mid-points of the inductors 218 and 219 are also connected through a resistor 222 and an inductor 223 to the return lead 224 of the amplifier tube 216.

The frequency discriminating circuit 217 has characteristics such that one of the pulses, for example, the intermediate frequency pulse corresponding to that received on the frequency $f_1$, may be derived from one end of the inductor 219 and applied by a lead 225 to an amplifier tube 226, whereas the intermediate frequency pulse corresponding to that received on the frequency $f_2$ may be derived from the other end of the inductor 219 and applied by a lead 227 to an amplifier tube 228. The output circuits of the amplifier tubes 226 and 228 are connected through selective intermediate frequency transformers 230 and 231 respectively to rectifiers 232 and 233 respectively. Resistors 234 and 235, in circuits with the rectifiers 232 and 233, are connected respectively across terminals 24 and 25 and across terminals 26 and 27 which correspond to the terminals 24, 25, 26 and 27 of Fig. 1. The pulses are thus separated and made individually available as positive pulses to the timing comparator.

The operation of this embodiment is similar to that above described except that only a single receiver is used instead of the two receivers indicated in Fig. 1.

In the embodiment of Fig. 4 a pair of pulses on channels $f_1$ and $f_2$ are received and detected in the tuner 210 and detector 212 and are applied to the amplifier 216 through a double peaked transformer 215 with transmission peaks corresponding in spacing to the two frequencies $f_1$ and $f_2$. These pulses are separated by the frequency discriminator circuit 217 and are individually amplified in the amplifiers 226 and 228. The amplifier outputs are rectified by the rectifiers 232 and 233 to produce voltage drops in the resistors 234 and 235 in the form of voltage pulses corresponding to the received pulses. The pulse received on the frequency $f_1$ is thus supplied to the terminals 24 and 25 and the pulse received on the frequency $f_2$ is supplied to the terminals 26 and 27. These terminals are connected to the timing comparator 32 as shown in Fig. 1 wherein their timing is compared and the relays 328 and 328*a* are selectively actuated in accordance with the pulse sequence.

It is to be understood that a plurality of channels may be used which may be pulsed in selected sequences for a multiple control. A pair of channels have been described for purposes of illustration only.

I claim as my invention:

1. A radio signalling system comprising radio transmitting means to propagate radiant energy on a plurality of radio frequency channels, a pulse forming circuit to form a series of energy pulses having a predetermined time sequence, means modulating said radio transmitting means with said pulses to selectively propagate the individual pulses of said series on different radio frequency channels, means controlling the relative sequence in frequency of said pulses on the various channels for signalling, radio receiving means responsive to said radiated pulses including means selective of the pulses on the various channels, and a circuit selective of the pulse sequence on the various channels connected to respond only to a predetermined relative sequence and only two said pulses being within a predetermined time interval of each other.

2. A radio signalling system comprising radio transmitting means to propagate radiant energy on a pair of radio frequency channels, a pulse forming circuit to form a pair of pulses in predetermined time sequence, means modulating said transmitting means with said pulses to propagate one pulse over one channel and the other pulse over the other channel in sequence, means controlling the relative sequence in frequency for signalling, radio receiving means to receive and separate said pulses, and means responsive to a predetermined relative pulse sequence and only with the second pulse thereof within a predetermined time interval of the first pulse of each pair.

3. A radio signalling system comprising radio transmitting means to propogate radiant energy on a pair of radio frequency channels, a pulse forming circuit to form a pair of pulses in predetermined time sequence, means modulating said transmitting means with said pulses to propagate one pulse over one channel and the other pulse over the other channel in sequence, means to select the relative sequence in the frequency channel for signalling, radio receiving means to receive and separate said pulses, a circuit selectively responsive to one relative pulse sequence and a second circuit responsive to the reverse pulse sequence, said circuits being thus responsive only with the second pulse of each pair within a predetermined time interval of the first pulse thereof.

4. A radio signalling system comprising radio transmitting means to propagate radiant energy on a pair of radio frequency channels, a pulse forming circuit to form a pair of pulses in predetermined time sequence, means modulating said transmitting means with said pulses to propogate one pulse over one channel and the other pulse over the other channel in sequence, means to select the relative sequence in the frequency channel for signalling, radio receiving means to receive and separate said pulses, a pair of channels individually selective of the relative pulse sequences, said channels being operable only with the second pulse of said pair of pulses within a predetermined time interval after the first pulse of said pair, and relay means actuated by each channel.

5. The signalling system claimed in claim 4, each of said channels comprising pulse stretching means to stretch the first pulse of each pair for said predetermined time interval and further comprising a coincidence circuit responsive only to the coincidence of a portion of said first pulse with said second pulse.

6. The signalling system claimed in claim 5, said pulse stretching circuit including a multivibrator circuit.

ELLISON S. PURINGTON.

REFERENCES CITED

The following references are of record in the file of this patent:

UNITED STATES PATENTS

| Number | Name | Date |
|---|---|---|
| 1,724,227 | Starr | Aug. 13, 1929 |
| 1,743,588 | Affel et al. | Jan. 14, 1930 |
| 1,801,146 | Finch | Apr. 14, 1931 |
| 1,889,292 | Ricchiardi | Nov. 29, 1932 |
| 2,001,747 | Runge | May 21, 1935 |
| 2,070,418 | Beverage | Feb. 9, 1937 |
| 2,183,147 | Moore et al. | Dec. 12, 1939 |
| 2,325,829 | Boswau | Aug. 3, 1943 |
| 2,395,478 | Hansell | Feb. 26, 1946 |
| 2,412,974 | Deloraine | Dec. 24, 1946 |
| 2,414,103 | Hunter | Jan. 14, 1947 |
| 2,453,659 | Bellescize | Nov. 9, 1948 |
| 2,464,667 | Boosman et al. | Mar. 15, 1949 |

FOREIGN PATENTS

| Number | Country | Date |
|---|---|---|
| 348,937 | Great Britain | May 21, 1931 |